US010606799B2

(12) United States Patent
Duminy et al.

(10) Patent No.: US 10,606,799 B2
(45) Date of Patent: Mar. 31, 2020

(54) TRANSFERRING DATA USING A DATA BRIDGE STRUCTURE

(71) Applicant: CA, INC., New York, NY (US)

(72) Inventors: Frederic Duminy, Lisle, IL (US); Jammie Pringle, Lisle, IL (US); Terry W. Chaisson, Lisle, IL (US); Dean Harrington, Lisle, IL (US)

(73) Assignee: CA, Inc., New York, NY (US)

( * ) Notice: Subject to any disclaimer, the term of this patent is extended or adjusted under 35 U.S.C. 154(b) by 309 days.

(21) Appl. No.: 15/642,888

(22) Filed: Jul. 6, 2017

(65) Prior Publication Data
US 2017/0300501 A1 Oct. 19, 2017

Related U.S. Application Data

(63) Continuation of application No. 14/668,645, filed on Mar. 25, 2015, now Pat. No. 9,727,567.

(51) Int. Cl.
*G06F 16/11* (2019.01)
*G06F 16/25* (2019.01)

(52) U.S. Cl.
CPC .......... *G06F 16/116* (2019.01); *G06F 16/258* (2019.01)

(58) Field of Classification Search
CPC ............................ G06F 16/116; G06F 16/258
USPC ......................................................... 707/756
See application file for complete search history.

(56) References Cited

U.S. PATENT DOCUMENTS

| 5,708,828 | A | * | 1/1998 | Coleman | H04L 29/06 715/205 |
| 5,758,314 | A | * | 5/1998 | McKenna | G06F 16/10 704/8 |
| 5,787,452 | A | * | 7/1998 | McKenna | G06F 9/454 715/234 |
| 6,021,259 | A | * | 2/2000 | Bahrs | H03M 7/46 358/1.15 |
| 6,658,625 | B1 | * | 12/2003 | Allen | G06F 9/541 715/236 |
| 6,993,717 | B2 | | 1/2006 | Minninger | |
| 7,099,803 | B1 | | 8/2006 | Rappoport | |

(Continued)

OTHER PUBLICATIONS

Alagiannis, Ioannis, et al.; "NoDB: Efficient Query Execution on Raw Data Files"; SIGMOD '12; Scotssdale, AZ, May 20-24, 2012; pp. 241-252.

(Continued)

*Primary Examiner* — Robert Stevens
(74) *Attorney, Agent, or Firm* — Kowert, Hood, Munyon, Rankin & Goetzel, P.C.

(57) ABSTRACT

A method of transferring data between a first computer language layer and a second computer language layer is described. According to the method, a first data bridge structure in a first data format is received from a first set of computer code using a first computer language layer. The first data format is used by the first set of computer code using the first computer language layer. In the method, the first data bridge structure is transformed from the first data format to a second data format, the second data format being a format used by a second set of computer code using a second computer language layer. The first data bridge structure in the second data format is transmitted to the second set of computer code using the second computer language layer.

20 Claims, 7 Drawing Sheets

(56) References Cited

U.S. PATENT DOCUMENTS

| | | | |
|---|---|---|---|
| 8,595,452 B1 * | 11/2013 | Katzer | ........... G06F 3/0607 |
| | | | 707/619 |
| 8,645,938 B2 | 2/2014 | O'Farrell | |
| 8,924,435 B1 | 12/2014 | Wen | |
| 2005/0108332 A1 | 5/2005 | Vaschillo | |
| 2012/0137304 A1 | 5/2012 | Boullery | |
| 2015/0046555 A1 | 2/2015 | Cohen | |
| 2016/0342645 A1 | 11/2016 | Tempero | |

OTHER PUBLICATIONS

Agt, Henning, et al.; "Metamodeling Foundation for Software and Data Integration"; UNISCON 2009; LNBIP 20, Springer-Verlag; Berlin, Germany; 12 pages.

* cited by examiner

TRANSFERRING DATA USING A DATA BRIDGE STRUCTURE

BACKGROUND

A computer uses binary representations of computer code and computer data to perform tasks and calculations. A computer language provides an abstraction from the details of the computer hardware. Computer program code is converted into binary instructions to manipulate data on the computer. A computer language uses a data format to represent data. A computer language layer uses a set of modules written in a computer language to perform a set of tasks. Different computer languages and different computer language layers may use different data formats to represent data.

BRIEF SUMMARY

According to one aspect of the present disclosure, a method is implemented by a computer program to transfer data between computer language layers. According to the method, a first data bridge structure in a first data format is received from a first set of computer code using a first computer language layer. The first data format is used in computer code executed within the first set of computer code using the first computer language layer. The first data bridge structure includes a request field that includes characters designating a request being made and an argument field that includes characters designating arguments to the request being made. The first data bridge structure also includes a first data value includes an integer value indicating integer data associated with the request being made. The second data bridge structure also includes a second data value includes an integer value indicating integer data associated with the request being made. The first data bridge structure also includes a character buffer to transfer character data between the first computer language layer and the second set of computer code using the second computer language layer, and a data buffer to transfer computer data between the first computer language layer and the second set of computer code using the second computer language layer. According to the method, the first data bridge structure is transformed from the first data format to a second data format. The second data format is used by the second set of computer code using the second computer language layer. The first data bridge structure is transferred to the second set of computer code using the second computer language layer.

According to one aspect of the present disclosure, a system for transferring data between computer language layers is described. The system includes a processor, memory communicatively connected to the processor, and a data bridge transfer system. The data bridge transfer system includes a receiving module to receive a first data bridge structure in a first data format from a first set of computer code using the first computer language layer. The first data format is used by the first set of computer code using the first computer language layer. The first data bridge structure includes a request field that includes characters designating a request being made and an argument field that includes characters designating arguments to the request being made. The first data bridge structure includes a first data value that is an integer indicating integer data associated with the request being made. The first data bridge structure includes a second data value that is an integer indicating integer data associated with the request being made. The first data structure also includes a character buffer to transfer character data between the first set of computer code using the first computer language layer and the second set of computer code using the second computer language layer and a data buffer to transfer computer data between the first set of computer code using the first computer language layer and the second set of computer code using the second computer language layer. The data bridge transfer system also includes a transforming module to transform the first data bridge structure from the first data format to a second data format. The second data format is used by a second computer language layer. The data communication system also includes a transmitting module to transmit the first data bridge structure to the second set of computer code using the second computer language layer. The data communication system also includes an accepting module to accept a second data bridge structure in the second data format from the second set of computer code using the second computer language layer, a converting module to convert the second data bridge structure from the second data format to the first data format, and a communicating module to communicate the second data bridge structure in the first data format to the first set of computer code using the first computer language layer.

According to one aspect of the present disclosure, a computer program product to transfer data between computer language layers is described. The computer program product includes a non-transitory tangible computer readable storage medium. The tangible computer readable storage medium includes computer readable program code embodied therewith. The computer readable program code, when executed by the processor, receives a first data bridge structure in a first data format from a first set of computer code using a first computer language layer. The first data format is used by the first set of computer code using the first computer language layer. The first data bridge structure includes a request field that includes characters designating a request being made, and an argument field that includes characters designating arguments to the request being made. The first data bridge structure includes a first data value that is an integer indicating integer data associated with the request being made. The first data bridge structure includes a second data value that is an integer indicating integer data associated with the request being made. The first data bridge structure also includes a character buffer to transfer character data between the first set of computer code using the first computer language layer and the second set of computer code using the second computer language layer, and a data buffer to transfer computer data between the first set of computer code using the first computer language layer and the second set of computer code using the second computer language layer. The computer readable program code also, when executed by the processor transforms the first data bridge structure from the first data format to a second data format. The second data format is used by the second set of computer code using the second computer language layer. The computer readable program code also, when executed by the processor, transmits the first data bridge structure to the second set of computer code using the second computer language layer, accepts a second data bridge structure in the second data format from the second set of computer code using the second computer language layer, converts the second data bridge structure from the second data format to the first data format, and communicates the second data bridge structure in the first data format to the first set of computer code using the first computer language layer.

BRIEF DESCRIPTION OF THE DRAWINGS

Aspects of the present disclosure are illustrated in the accompanying drawings by way of example and the accompanying drawings do not limit the scope of the claims.

Throughout the drawings, identical reference numbers designate similar, but not necessarily identical, elements.

DETAILED DESCRIPTION

Figure 1:
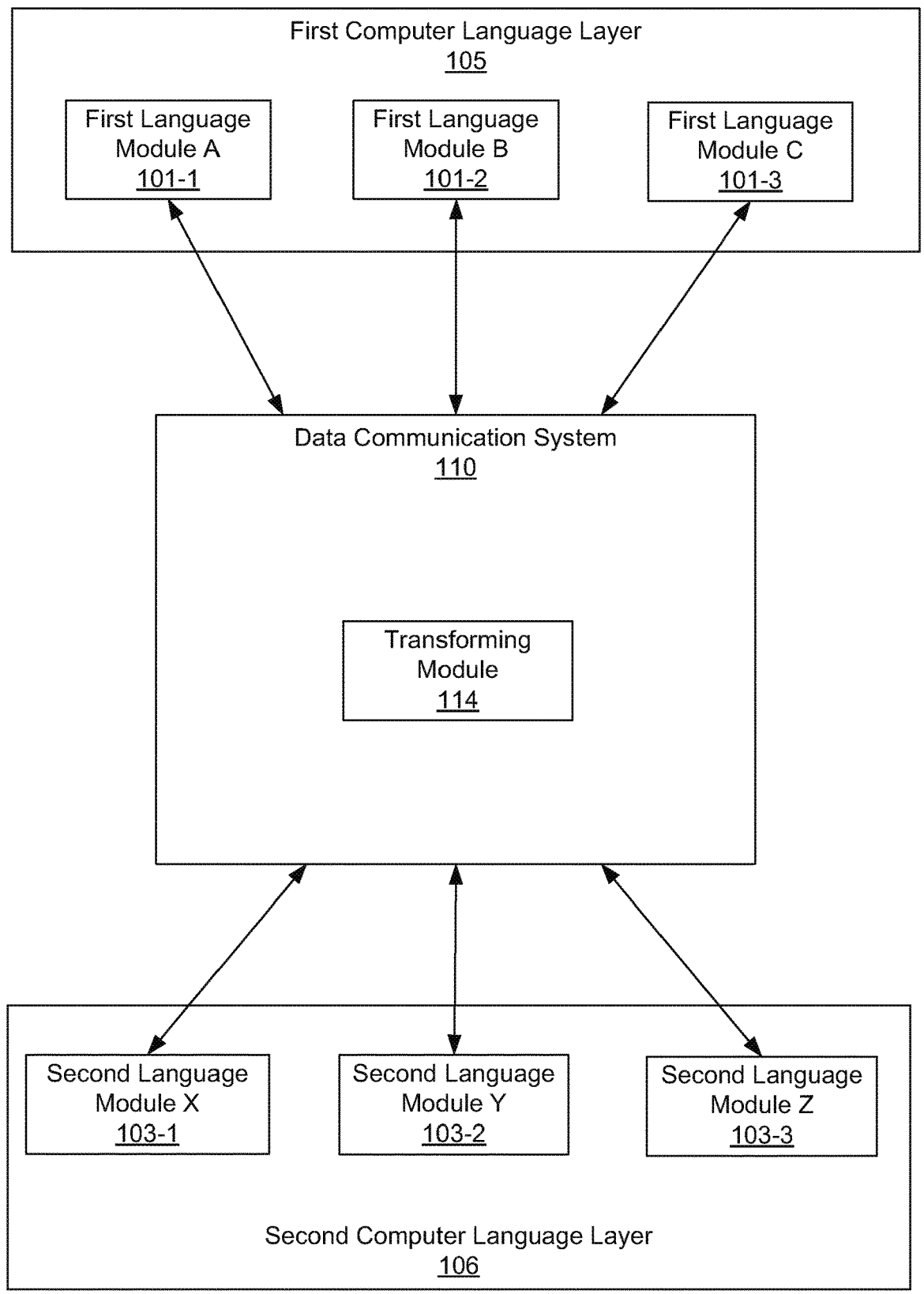
FIG. 1 is a diagram of a system for transferring data between computer language layers using a data bridge structure, according to one example of the principles described herein.

The present specification describes a method, system, and computer program product for transferring data between computer language layers using a data bridge structure, such that a number of interfaces between the first set of computer code using the first computer language layer and the second set of computer code using the second computer language layer use a single communication interface.

The subject matter described herein may be a system, a method, and/or a computer program product. The computer program product may include a computer readable storage medium (or media) having computer readable program instructions thereon for causing a processor to carry out aspects of the subject matter described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but is not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but is not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment, or offered as a service such as a Software as a Service (SaaS).

Aspects of the present disclosure are described herein with reference to flowchart illustrations and/or block diagrams of methods, apparatuses (systems) and computer program products according to examples of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, can direct a computer, other programmable data processing apparatus, or other devices to function in a particular manner, such that the instructions, when stored in the computer readable medium, produce an article of manufacture including instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular aspects and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function, in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

A computer language is used to perform functions on a computing device. Multiple computer languages may be used; one computer language may be used instead of another computer language to perform a particular function. A number of computer language layers may communicate with one another to facilitate operations being performed by each computer language layer. In this manner, each computer language layer may perform a task instead of another computer language layer. The different computer language layers may have different data formats. A first computer language layer interacting with a second computer language layer converts the data into a format used by the second set of computer code using the second computer language layer. The first set of computer code using the first computer language layer transforms data for each interface with the second set of computer code using the second computer language layer. A data bridge system, allowing a number of interfaces to share data transformation between the first set of computer code using the first computer language layer and the second set of computer code using the second computer language layer using a data bridge structure, allows the computer language layers to communicate without replicating the data transformation code.

According to the principles described herein, a system for communicating between a first computer language layer and a second computer language layer using a data bridge structure may allow a number of interfaces to use the data bridge structure without replicating code to transform data between the computer language layers. The data transferring system receives a data bridge structure from the first set of computer code using the first computer language layer. The data transferring system transforms the data bridge structure from a first format used by the first set of computer code using the first computer language layer to a second format used by a second computer language layer. The data transferring system transmits the data bridge structure, in the second format, to the second set of computer code using the second computer language layer.

As used in the present specification and in the appended claims, the term "a number of" or similar language may include any positive number, including one to infinity; zero not being a number, but the absence of a number.

Still further, as used in the present specification and the appended claims, the term "computer language layer" refers broadly to a component or number of components that use a particular computer language. The computer language layer may include an entire program, or may represent a portion of a program that controls the activity of a computing device.

Still further, as used in the present specification and the appended claims, the term "data bridge structure" refers to a data structure that can be used to share data between a number of different computer language layers.

Still further, as used in the present specification and the appended claims, the term "big endian" refers to a system of representing data in a digital format where the most significant bytes are placed first. For example, an integer value represented in binary format would have the most significant bits put first.

Still further, as used in the present specification and the appended claims, the term "little endian" refers to a system of representing data in a digital format where the least significant bytes are placed first. For example, integer value represented in binary format would have the least significant bits put first.

Still further, as used in the present specification and the appended claims, the term "boundary data pattern" refers to a data pattern that may be placed in memory to indicate a boundary. A boundary data pattern uses a data pattern that is unlikely to be used in that memory location to indicate a boundary. A boundary data pattern may be written and then read to detect if the memory has been written to. A boundary data pattern may be a data pattern intended to cause a memory fault if referenced, making it easier to identify code that referenced the boundary data pattern.

Still further, as used in the present specification and the appended claims, the term "adjacent" refers to placing a boundary data pattern next to or adjoining another piece of data. Adjacent may refer to placing a boundary data pattern after another piece of data. Adjacent may also refer to placing a boundary data pattern before another piece of data.

Even further, as used in the present specification and the appended claims, the terms "transform" or "convert" refer broadly to making a change in the form, appearance, or character of data. The data may still be interpreted as representing the same information. The interpretation of the post-transformation data may be different than the interpretation of the pre-transformation data.

Referring now to the figures, FIG. 1 is a diagram of a system (110) for transferring data between computer language layers (105, 106) using a data bridge structure, according to one example of the principles described herein. For example, the data bridge transferring system (110) transfers data from a first computer language layer (105) to a second computer language layer (106). Specifically, the data bridge transferring system (110) includes at least a data transforming module (114) to transform data from a first format used by a first computer language layer (105) to a second format used by a second computer language layer (106).

The first set of computer code using the first computer language layer (105) includes a number of first language modules (101-1, 101-2, 101-3). Specifically, as depicted in FIG. 1, the first set of computer code using the first computer language layer (105) includes first language module A (101-1), first language module B (101-2) and first language module C (101-3). Similar to the first set of computer code using the first computer language layer (105), the second set of computer code using the second computer language layer (106) includes a number of modules, specifically a number of second language modules (103). For example, the second set of computer code using the second computer language layer (106) includes second language module X (103-1), second language module Y (103-2) and second language module Z (103-3). Each module (103) in the second set of computer code using the second computer language layer (106) may also have a number of different interfaces.

The first language modules (101) each may communicate a data bridge structure to the data bridge transferring system (110). The data bridge transferring system (110) transforms the data bridge structure and transmits the transformed structure to the second language layer (106). In some examples, the different language modules (101) may each communicate different data in different formats to the data bridge transferring system (110) for transformation through a number of different interfaces. A module (101) may include a number of interfaces to communicate with other modules, for example, the modules (103) in the second set of computer code using the second computer language layer (106). The transformed data bridge structures may then be communicated to a number of different interfaces in the second set of computer code using the second computer language layer (106). The data bridge transferring system (110) allows a first language module (101) to communicate with a second language module (103) in the second set of computer code using the second computer language layer (106).

In some examples, the data bridge transferring system (110) may be part of the first set of computer code using the first computer language layer (105), and may receive the first data bridge structure as part of a computer function invocation. In other examples, the data bridge transferring system (110) may be part of the second set of computer code using the second computer language layer (106), and may receive the data bridge structure as part of an inter-language interface layer. In yet another example, the data bridge transferring system (110) may be independent of both the first set of computer code using the first computer language layer (105) and the second set of computer code using the second computer language layer (106) and may communicate with both through an inter-language interface layer.

A specific example of transforming a first data bridge structure to a second computer language layer (106) is given as follows. In this example, the first set of computer code using the first computer language layer (105) is an application written in the programming language Java. The application may use the American Standard Code for Information Interchange (ASCII) character set and may encode integer values as big endian. Accordingly, the first data bridge structure is prepared with character fields in ASCII and big endian integer values. Further in this example, the second set of computer code using the second computer language layer (106) may be a native language that uses the Extended Binary Coded Decimal Interchange Code (EBCDIC) character set and encodes integer values as little endian. Accordingly, the transforming module (114) transforms character fields from ASCII to EBCDIC and transforms big endian integers to little endian integers. After the transformation, the data bridge transferring system (110) transmits the converted first data bridge structure to the second set of computer code using the second computer language layer.

Figure 2:
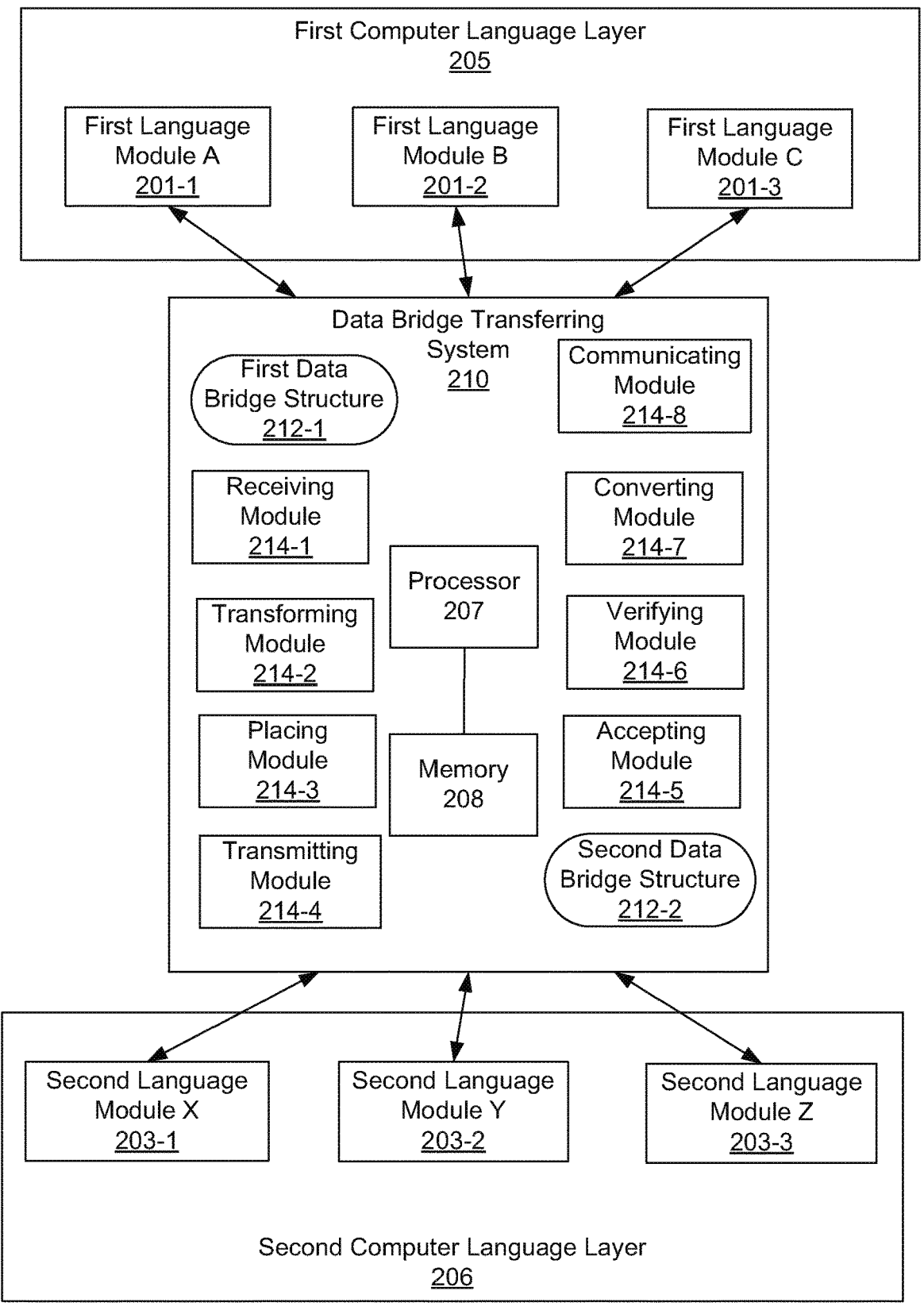
FIG. 2 is a diagram of a system for transferring data between computer language layers using a data bridge structure, according to one example of the principles described herein.

FIG. 2 is a diagram of a system (210) for transferring data between computer language layers (205, 206) using a data bridge structure (212-1), according to one example of the principles described herein. As illustrated in FIG. 1, an environment includes a data bridge transferring system (210), a first computer language layer (205), and a second computer language layer (206). The first set of computer code using the first computer language layer (205) includes a number of first language modules (201-1, 201-2, 201-3). Each module (201) may include a number of interfaces to communicate with other modules (201, 203). The first language modules (201) communicate with a second computer language layer (206) through the data bridge transferring system (210). The second set of computer code using the second computer language layer (206) includes a number of second language modules (203-1, 203-2, 203-3).

The data bridge transferring system (210) may be implemented on a computing device executing both the first set of computer code using the first computer language layer (205) and the second set of computer code using the second computer language layer (206). When the first set of computer code using the first computer language layer (205) and the second set of computer code using the second computer language layer (206) are executing on separate computing devices, the data bridge transferring system (210) may reside on either computing device. Alternatively, the data bridge transferring system (210) may reside on a separate computing device. The data bridge transferring system (210) includes a processor (207) communicatively connected to memory (208). The data bridge transferring system (210)

also may include a number of modules (214). The modules (214) may be implemented as computer program code which, when executed by the processor (207), performs a designated function. The modules (214) may be implemented as a combination of hardware and program instructions to perform a designated function. The program code causes the processor to execute the designated function of the engine.

As described above, the data bridge transferring system (210) receives a first data bridge structure (212-1) from one of the first language modules (201) in the first set of computer code using the first computer language layer (205). The first data bridge structure (212-1) represents a computer data structure for communicating data between the first set of computer code using the first computer language layer (205) and the second set of computer code using the second computer language layer (206). The first data bridge structure (212-1) includes a mixture of character data and binary data. Character data represents data in a character set that can be presented to a user. Binary data represents data that is interpreted by a computer. Binary data may include integers, floating point values, or abstract data structures that combine a number of different data formats. The first data bridge structure (212-1) may include a request field in character format, an argument field in character format, a first data value in integer format, a second data value in integer format, a character buffer in character format, and a data buffer in binary format.

The data bridge transferring system (210) includes a receiving module (214-1) to receive a first data bridge structure (212-1) in a first data format from the first set of computer code using the first computer language layer (205). The first data format is a format used by the first set of computer code using the first computer language layer (205). For example, first language module A (201-1) may send and receive data using the first data format. The first language module A (201-1) may prepare a first data bridge structure (212-1) to transmit corresponding data to the second language module X (203-1) in the second set of computer code using the second computer language layer (206). In this example, the receiving module (214-1) receives the first data bridge structure (212-1) from the first language module A (201-1) in the first data format.

The data bridge transferring system (210) includes a transforming module (214-2) to transform the first data bridge structure (212-1) from the first data format to a second data format. The second data format being used by a second computer language layer (206). For example, the transforming module (214-2) may transform character data in the first data bridge structure (212-1) from a first character set to a second character set. In some examples, the transforming module (214-2) may perform a character by character transformation. The first data bridge structure (212-1) may be replicated before sending the first data bridge structure (212-1) to the second set of computer code using the second computer language layer (206). Replicating the data may include allocating a new memory location and then copying the data from the first data bridge structure (212-1) to the new memory location. The first data bridge structure (212-1) may be replicated to provide space for the placing module (214-3) to place a boundary data pattern. Replicating the first data bridge structure (212-1) may also preserve the data received form the first set of computer code using the first computer language layer (205).

Continuing the example provided above, the first data format may use the ASCII character set and the second data format may use the EBCDIC character set. In this example, the transforming module (214-2) transforms the request field, the argument field, and the character buffer from a first character set to a second character set. In other words, in this specific example, the request field, argument field, and character buffer are transformed from the ASCII character set to the EBCDIC character set. While specific reference is made to the ASCII and EBCDIC character sets, any number of data formats may be used. For example, a computer language layer may use the extended American Standard Code for Information Interchange (extended-ASCII) character set, which includes additional characters not used in the ASCII character set. In this example, the first data format may rely on the extended-ASCII character set and the second data format may rely on the ASCII character set. The transforming module (214-2) transforms the request field, the argument field, and the character buffer from the extended-ASCII character set to the ASCII character set.

The data bridge transferring system (210) may also include a transmitting module (214-4) to transmit the converted first data bridge structure (212-1) to the second set of computer code using the second computer language layer (206) in the second data format. A second language module (203) in the second set of computer code using the second computer language layer (206) may then receive and process the data in the first data bridge structure (212-1).

In some examples, the data bridge transferring system (210) may also include a placing module (214-3) to place a boundary data pattern adjacent to the character buffer in the first data bridge structure (212-1). While specific reference is made to placing the boundary data pattern adjacent to the character buffer, the placing module (214-3) may place a boundary data pattern adjacent to any field, or any number of fields, in the first data bridge structure (212-1) before the first data bridge structure (212-1) is transmitted to the second set of computer code using the second computer language layer (206). For example, placing a boundary data pattern adjacent to any field may include placing the boundary data pattern before or after the field. The boundary data pattern may be written and then read to detect if the computer code has caused memory to be modified outside of the allotted memory area.

In some examples, the second language modules (203) may process the data in the first data bridge structure (212-1), and communicate a second data bridge structure (212-2) to the first language layer (205). The first data bridge structure (212-1) and the second data bridge structure (212-2) may be the same structure. In other words, both bridge structures (212-1, 212-2) may include the same fields and buffers. In these examples, the second set of computer code using the second computer language layer (206) may similarly communicate data to the first set of computer code using the first computer language layer (205). Accordingly, the data bridge transferring system (210) may include an accepting module (214-5) to accept a second data bridge structure (212-2) in the second data format from the second set of computer code using the second computer language layer (206). The data bridge transferring system (210) may also include a converting module (214-7) to convert the second data bridge structure (212-2) from the second data format to the first data format. For example, the converting module (214-7) may transform character data in the second data bridge structure (212-2) from the second character set to the first character set, for example, by performing a character by character transformation. The data in the second data bridges structure (212-2) may be replicated prior to sending the second data bridge structure (212-2) to the first computer program layer (205). The replicated data representing the second data bridge structure (212-2) may be sent to the first computer program layer (206).

The data bridge transferring system (210) may include a communicating module (214-8) to communicate the second data bridge structure (212-2) in the first data format to the first set of computer code using the first computer language layer (205). A first language module (201) in the first set of computer code using the first computer language layer (205) may then receive and process the data in the second data bridge structure (212-2).

The data bridge transferring system (210) may also include a verifying module (214-6) to verify that the boundary data pattern is adjacent to the appropriate field in the second data bridge structure (212-2), which is accepted from the second set of computer code using the second computer language layer (206). More specifically, the verifying module (214-6) may verify that the boundary data pattern is in the same position, relative to how it was placed by the placing module (214-3). The boundary data pattern may be written and then read to detect if the computer code has caused memory to be modified outside of the allotted memory area. By verifying the boundary data pattern position, the data bridge transferring system (210) can determine if and when the second set of computer code using the second computer language layer (206) has modified memory outside of the field. A modification of memory outside of the field can indicate a programming error in the second set of computer code using the second computer language layer (206). The programming error may corrupt memory causing program failures. Detecting the modification of memory outside of the field in the second data bridge structure (212-2) allows the data bridge transferring system (210) to identify memory corruption.

A specific example according to FIG. 2 will now be described. In this example, the first language module A (201-1) in the first set of computer code using the first computer language layer (205) communicates with a module implemented in the second set of computer code using the second computer language layer (206). In this example, first language module A (201-1) assigns data to the first data bridge structure (212-1). The assignment may occur via a library wrapper function call, where arguments to a function are assigned to the first data bridge structure (212-1). The first language module A (201-1) may include code to assign data to the fields in the first data bridge structure (212-1). The first language module A (201-1) then sends the first data bridge structure (212-1) to the data bridge transferring system (210).

The receiving module (214-1) in the data bridge transferring system (210) receives the first data bridge structure (212-1). The transforming module (214-2) then transforms the first data bridge structure (212-1) from the first data format to a second data format, for example by performing a character by character transformation of character fields in the first data bridge structure (212-1) from a first character set to a second character set.

The placing module (214-3) may then place a boundary data pattern adjacent to fields in the first data bridge structure (212-1) before the first data bridge structure (212-1) is sent to the second computer program layer (206). In some examples, the first data bridge structure (212-1) may be replicated before sending the first data bridge structure to the second computer program layer (206). As will be described below, the data bridge transferring system (210) later verifies that neither the boundary data pattern, nor its placement by the placing module (214-3) has been altered. The placement and verification of the boundary data patterns allows the data bridge transferring system (210) to detect program errors that modify memory outside the structure. The transmitting module (214-4) may then transmit the first data bridge structure (212-1), in the second data format, to the second language module X (203-1) in the second set of computer code using the second computer language layer (206).

Continuing the example, the second language module X (203-1) then receives and processes the first data bridge structure (212-1). When the second language module X (203-1) completes operation on the first data bridge structure (212-1), the second language module X (203-1) may send data back to the data bridge transferring system (210). The second language module X (203-1) may use the same memory location on the data transfer system to communicate the second data bridge structure (212-2) to the first set of computer code using the first computer language layer (205) as was used to receive the first data bridge structure (212-1).

The accepting module (214-5) in the data bridge transferring system (210) accepts from the second language module X (203-1), a second data bridge structure (212-2) in the second data format. The verifying module (214-6) may then verify that the boundary data pattern placed by the placing module (214-3) remains unchanged.

The converting module (214-7) converts the second data bridge structure (212-2) from the second data format to the first data format. The communicating module (214-8) then communicates the second data bridge structure (212-2), in the first data format, to the first language module A (201-1). The first language module A (201-1) then receives and process the second data bridge structure (212-2)

Figure 3:
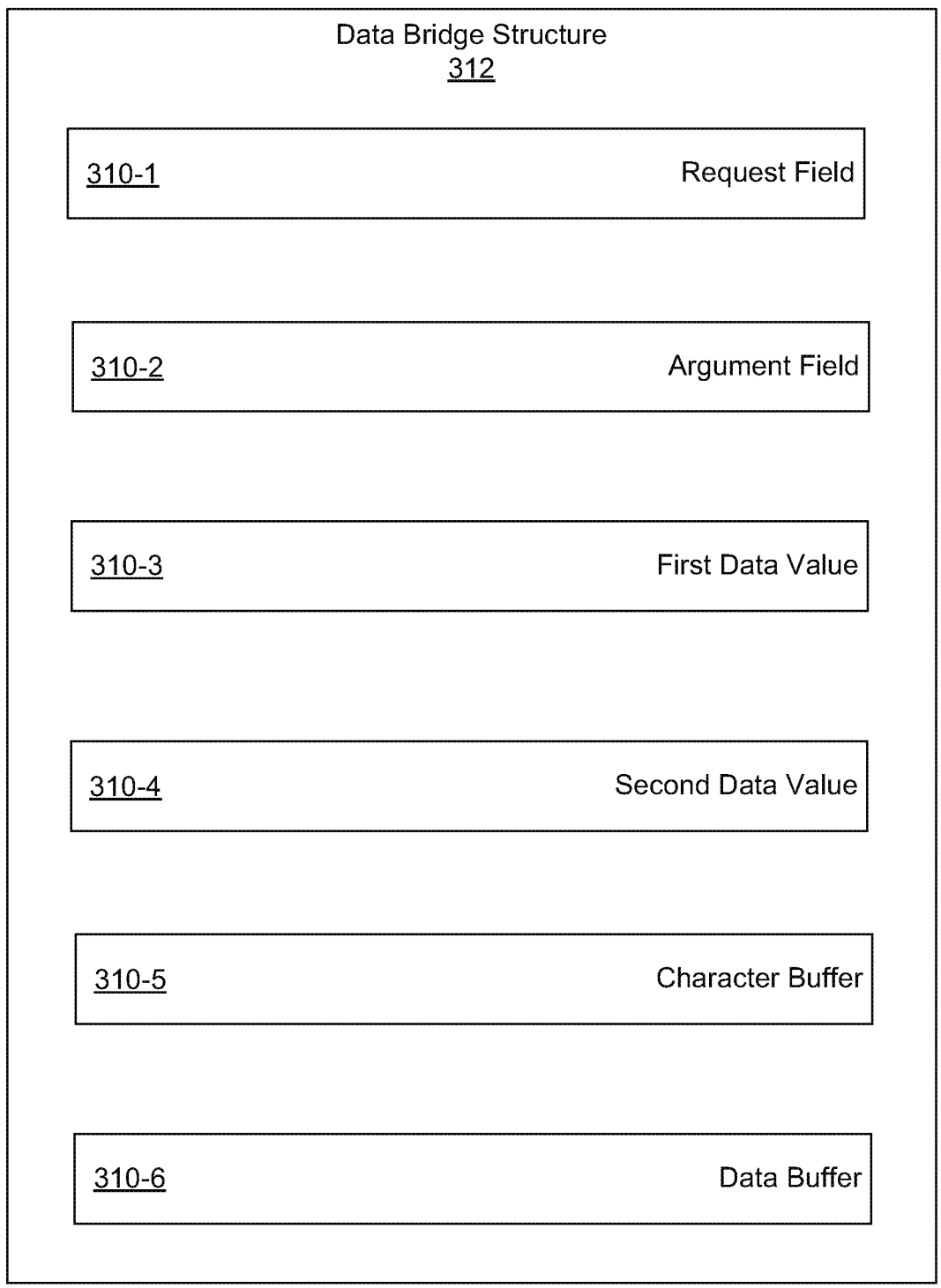
FIG. 3 is a diagram of a data bridge structure, according to one example of the principles described herein.

FIG. 3 is a diagram of a data bridge structure (312), according to one example of the principles described herein. As described above, the data bridge structure (312) is used by a data bridge transferring system (FIG. 1, 110) to communicate data between a first computer language layer (FIG. 1, 105) and a second computer language layer (FIG. 1, 106).

The data bridge structure (312) includes a request field (310-1). The request field (310-1) includes a number of characters indicating a function to be performed for the first set of computer code using the first computer language layer (FIG. 1, 105) by the second set of computer code using the second computer language layer (FIG. 1, 106). For example, a first computer language layer (FIG. 1, 105) communicates with a module in a second computer language layer (FIG. 1, 106) to perform a read operation by assigning the character string "read" to the request field (310-1). The module in the second set of computer code using the second computer language layer compares the request field to the string "read" and determines that a read operation is to be performed. The second language layer performs a read operation for the first set of computer code using the first computer language layer. The request field (310-1) may indicate to the second set of computer code using the second computer language layer (FIG. 1, 106) which second language module (FIG. 1, 103) is to receive the data bridge structure (312). As the request field (310-1) is a character field, the data bridge transferring system (FIG. 1, 110) may transform the request field (310-1) from a first data format that includes a first character set to a second data format that includes a second character set. In a specific example, the transforming module (FIG. 1, 114-2) transforms the request field (310-1) from the ASCII character set to the EBCDIC character set. In some examples, the request field (310-1) is not used when the second set of computer code using the second computer language layer (FIG. 1, 106) returns data to the first set of computer code using the first computer language layer (FIG. 1, 105).

The argument field (310-2) includes a number of characters indicating arguments to the function specified by the request field (310-1). The argument field (310-2) provides additional data for the function specified by the request field (310-1). For example, a first computer language layer (FIG. 1, 105) communicates with a module in a second computer language layer (FIG. 1, 106) to perform an open operation. The open operation uses the argument field (310-2) by assigning the character string indicating the name of the file to the request field (310-2). The module in the second set of computer code using the second computer language layer uses the argument field to specify the name of the file to open. The second language layer performs a read operation for the first set of computer code using the first computer language layer. The argument field (310-2) is a character field. The data bridge transferring system (FIG. 1, 110) may transform the argument field (310-2) from a first data format that includes a first character set to a second data format that includes a second character set. In some examples, the argument field (310-1) is not used when the second set of computer code using the second computer language layer (FIG. 1, 106) returns data to the first set of computer code using the first computer language layer (FIG. 1, 105).

The first data value (310-3) is an integer value. An integer value stores a whole number, such as one, two, three, or up to the capacity of the storage area for an integer value on the system. An integer value may include zero. The first data value (310-3) provides an integer value. The first set of computer code using the first computer language layer (FIG. 1, 105) may use the first data value (310-3) to communicate integer values to the second set of computer code using the second computer language layer (FIG. 1, 106) without modifying the data buffer. In one example, the first data value (310-3) is used to provide a code indicating the success of failure of the request made to the second set of computer code using the second computer language layer (FIG. 1, 106). In another example, the first data value (310-3) is used to provide a single data value for the operation of the request made to the second set of computer code using the second computer language layer (FIG. 1, 106). As described, the data bridge transferring system (FIG. 1, 110) may alter the presentation of the first data value (310-3). In one example, the transforming module (FIG. 1, 114-2) transforms the first data value (310-3) from a big endian format to a little endian format. In another example, the transforming module (FIG. 1, 114-2) transforms the first data value from a sixty-four-bit representation to a thirty-two-bit by deleting thirty two bits of the data in the first data value.

The second data value (310-4) is an integer value. The data bridge transferring system (FIG. 1, 110) may alter the presentation of the second data value (310-4). For example, the transforming module (FIG. 1, 114-2) transforms the second data value (310-4) from a big endian format to a little endian format. In one example, the second data value (310-4) is used to provide a location in computer code that set the first data value (310-3) was set. In another example, the second data value (310-4) is used to provide a single data value for the operation of the request made to the second set of computer code using the second computer language layer (FIG. 1, 106). As described, the data bridge transferring system (FIG. 1, 110) may alter the presentation of the second data value (310-4).

The character buffer (310-5) includes a number of characters indicating data that may be sent from the first set of computer code using the first computer language layer (FIG. 1, 105) to the second set of computer code using the second computer language layer (FIG. 1, 106). The character buffer (310-5) is used to provide character information to the second set of computer code using the second computer language layer (FIG. 1, 106). For example, the character buffer (310-5) may be used to provide an errors message in a language to be communicated to the computer system. The character buffer (310-5) may be a series of characters in the data bridge structure (312). The character buffer (310-5) may be a reference to another area of memory containing a series of characters. In some examples, the character buffer (310-5) may be a fixed size or may be of variable sized with a value indicating the end of the character buffer (310-5). The character buffer (310-5) may indicate data from the second set of computer code using the second computer language layer (FIG. 1, 106) to the first set of computer code using the first computer language layer (FIG. 1, 105). The character buffer (310-5) is a character field. The data bridge transferring system (FIG. 1, 110) may transform the character buffer (310-5) from a first data format that includes a first character set, to a second data format that includes a second character set.

The data buffer (310-6) may be a binary field representing an abstract data structure to be interpreted by a computer programming language. For example, the data buffer (310-6) may provide a data structure with a number of fields being communicated from the first set of computer code using the first computer language layer (FIG. 1, 105) to the second set of computer code using the second computer language layer (FIG. 1, 106). The data bridge transferring system (FIG. 1, 110) may alter the presentation of the data buffer (310-6). In one example, the transforming module (FIG. 1, 114-2) transforms the data buffer (310-6) from a big endian format to a little endian format.

Figure 4:
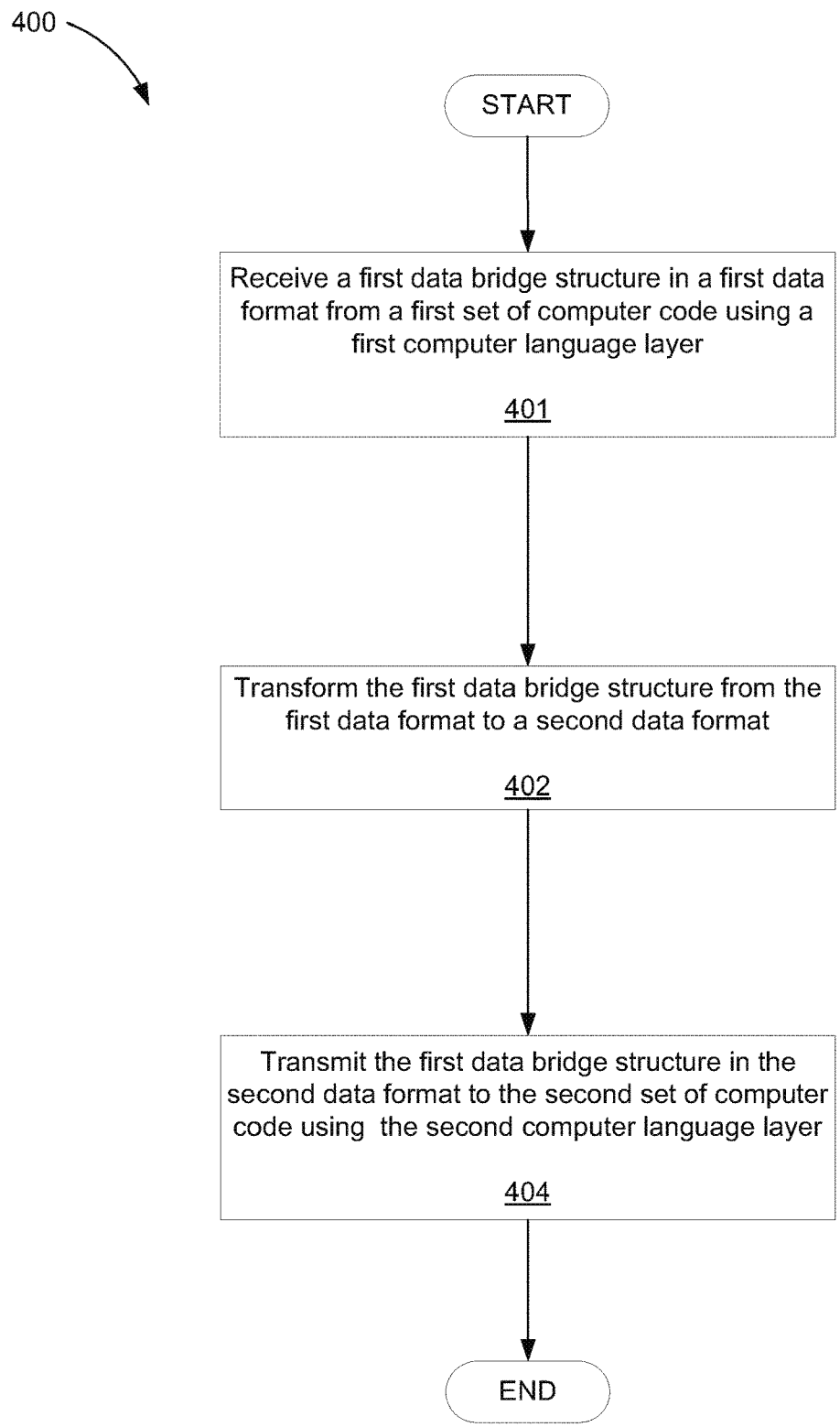
FIG. 4 is a flowchart of a method for transferring data between compute language layers using a data bridge structure, according to one example of the principles described herein.

FIG. 4 is a flowchart of a method for transferring data between a first computer language layer (FIG. 1, 105) and a second computer language layer (FIG. 1, 106) using a data bridge structure (FIG. 2, 212), according to one example of the principles described herein. The method (400) may be executed by the data bridge transferring system (FIG. 1, 110). The method (400) may be executed by other systems (i.e. data bridge transferring system 210, system 602, system 700).

The method (400) includes receiving (block 401) a first data bridge structure (FIG. 2, 212-1) in a first data format from a first set of computer code using a first computer language layer (FIG. 1, 105). For example, the data receiving module (FIG. 2, 214-1) may receive (block 401) the first data bridge structure (FIG. 2, 212-1) in the first data format from the first set of computer code using the first computer language layer (FIG. 1, 105). The first data format is a format used by the first set of computer code using the first computer language layer (FIG. 1, 105) that includes a request field (FIG. 3, 310-1), an argument field (FIG. 3, 310-2), a first data value (FIG. 3, 310-3), a second data value (FIG. 3, 310-4), a character buffer (FIG. 3, 310-5), and a data buffer (FIG. 3, 310-6). The method (400) may receive (block 401) the first data bridge structure (FIG. 2, 212-1) from a number of first language modules (FIG. 1, 101).

The method (400) also includes transforming (block 402) the first data bridge structure (FIG. 2, 212-1) from the first data format to a second data format. For example, the transforming module (214-2) may transform (block 402) all of the first data bridge structure (FIG. 2, 212-1) or part of the first data bridge structure (FIG. 2, 212-1) from a first data format, used by the first set of computer code using the first computer language layer (FIG. 1, 105) into a second data format, used by the second set of computer code using the second computer language layer (FIG. 1, 106). The method (400) may use a number of different data transformations in transforming (block 402) different fields in the first data bridge structure (FIG. 2, 212-1).

The method (400) includes transmitting (block 403) the first data bridge structure (FIG. 2, 212-1) in the second data format to the second set of computer code using the second computer language layer (FIG. 1, 106). For example, the transmitting module (FIG. 2, 214-4) transmits the first data bridge structure (FIG. 2, 212-1) to the second set of computer code using the second computer language layer (FIG. 1, 106).

Figure 5:
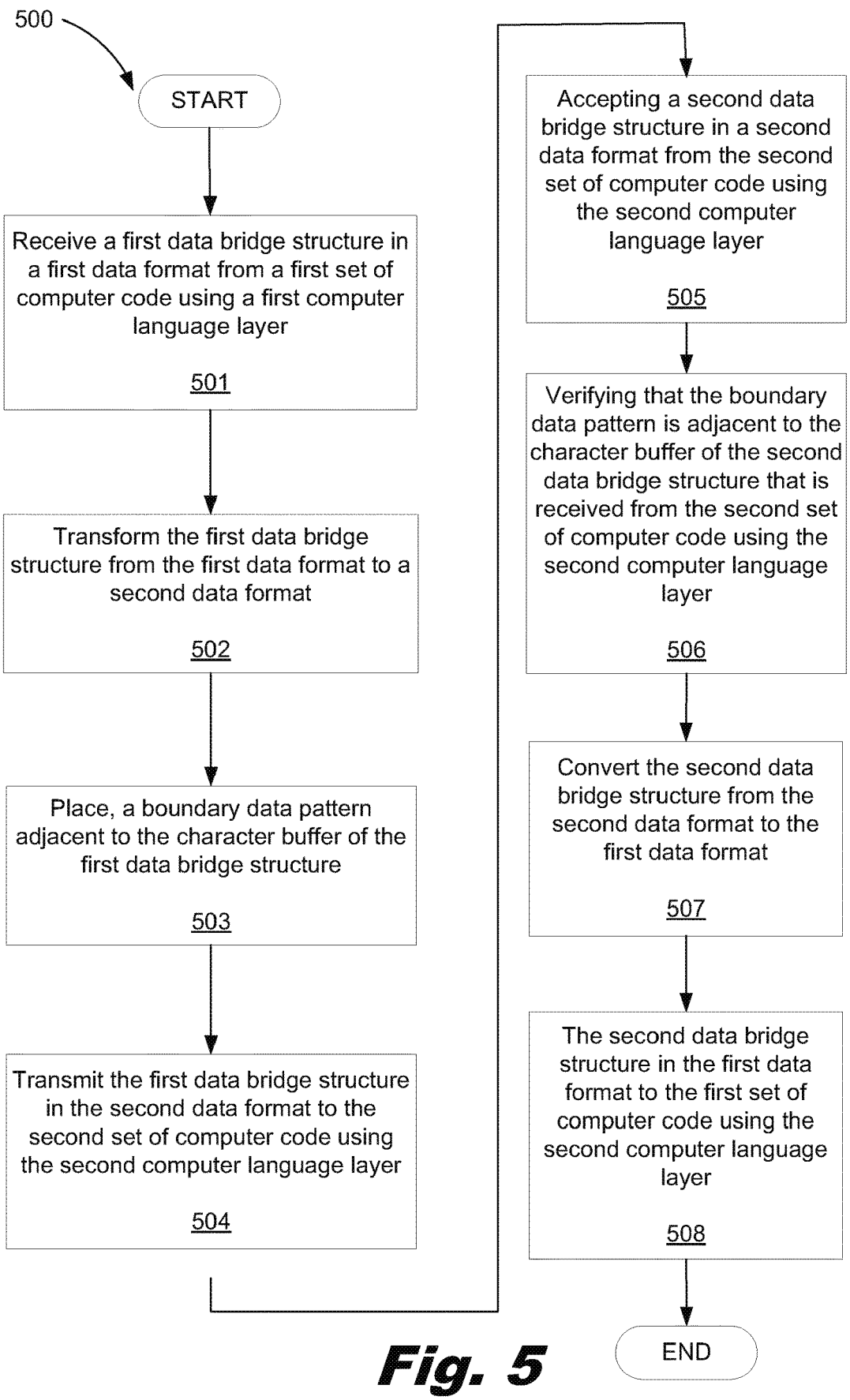
FIG. 5 is a flowchart of a method for transferring data between computer language layers using a data bridge structure, according to another example of the principles described herein.
Figure 6:
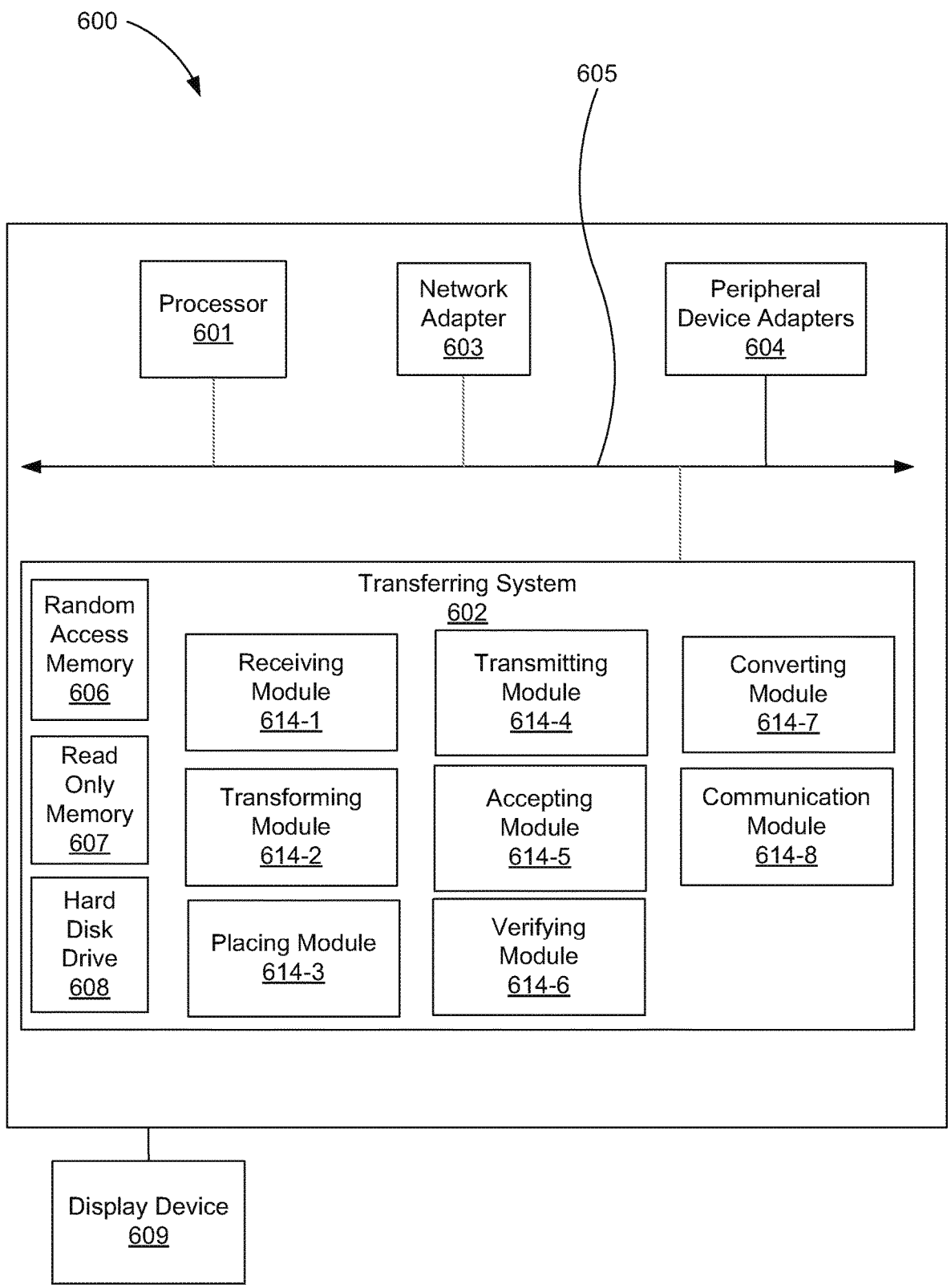
FIG. 6 is a diagram of a computing device for transferring data between computer language layers using a data bridge structure, according to one example of the principles described herein.

FIG. 5 is a flowchart of a method (500) for transferring data from a first computer language layer (FIG. 1, 105) to a second computer language layer (FIG. 1, 106) using a data bridge structure (FIG. 2, 212-1), according to one example of the principles described herein. The method (500) may be executed by the data bridge transferring system (FIG. 1, 110). The method may be executed by other systems (i.e. system 210, system 602, system 700).

The method (500) includes receiving, (501) a first data bridge structure (FIG. 2, 212-1) in a first data format from a first set of computer code using a first computer language layer (FIG. 1, 105). This may be performed as described above in connection with FIG. 4.

The method (500) includes transforming (block 502) the first data bridge structure (FIG. 2, 212-1) from the first data format to a second data format. This may be performed as described above in connection with FIG. 4.

The method (500) includes placing (block 503) a boundary data pattern adjacent to a buffer in the first data bridge structure (FIG. 2, 212-1). The placing module (FIG. 2, 214-3) may place a boundary data pattern adjacent to a field in the first data bridge structure (FIG. 2, 212-1). For example, a boundary data pattern may be placed (block 503) adjacent to the character buffer (FIG. 3, 310-5) in the first data bridge structure (FIG. 2, 212-1). In another example, a boundary data pattern may be placed (block 503) adjacent to the data buffer (FIG. 3, 310-6) in the first data bridge structure (FIG. 2, 212-1).

The method (500) includes transmitting (block 504) the first data bridge structure (FIG. 1, 212-1) in the second data format to the second set of computer code using the second computer language layer (FIG. 1, 106). The second set of computer code, using the second computer language layer (FIG. 1, 106), may then act on the first data bridge structure (FIG. 2, 212-1).

The method (500) includes accepting (block 505), from the second set of computer code using the second computer language layer (FIG. 1, 106), a second data bridge structure in the second data format. The second data bridge structure (FIG. 2, 212-2) includes a number of fields. For example, the second data bridge structure (FIG. 2, 212-2) includes a request field (FIG. 3, 310-1), representing characters designating a request being made. The second data bridge structure (FIG. 2, 212-2) includes an argument field (FIG. 3, 310-2) representing characters designating arguments to the request being made. The second data bridge structure (FIG. 2, 212-2) includes a first data value (FIG. 3, 310-3) representing an integer value indicating integer data associated with the request being made. The second data bridge structure (FIG. 2, 212-2) includes a second data value (FIG. 3, 310-4) representing an integer value associated with the request being made. The second data bridge structure (FIG. 2, 212-2) includes a character buffer (FIG. 3, 310-5) representing character data being transferred between the first set of computer code using the first computer language layer and the second set of computer code using the second computer language layer. The second data bridge structure (FIG. 2, 212-2) includes a data buffer (FIG. 3, 310-6), representing computer data being transferred between the first set of computer code using the first computer language layer, and the second set of computer code using the second computer language layer.

The method (500) includes verifying (block 506) that the boundary data pattern is adjacent to the appropriate field in the second data bridge structure (FIG. 2, 212-2) that is accepted from the second set of computer code using the second computer language layer (FIG. 1, 106). A verifying module (FIG. 2, 214-6) may verify (block 506) that the boundary data pattern is adjacent to a field in the second data bridge structure (FIG. 2, 212-2). For example, the verifying module (FIG. 2, 214-6) may verify (block 506) that the boundary data pattern is adjacent to the character buffer (FIG. 3, 310-5) in the second data bridge structure (FIG. 2, 212-2) that is accepted from the second set of computer code using the second computer language layer (FIG. 1, 106). In another example, the method (500) may include verifying (block 506) that the boundary data pattern is adjacent to the data buffer (FIG. 3, 310-6) in the second data bridge structure (FIG. 2, 212-2) that is accepted from the second set of computer code using the second computer language layer (FIG. 1, 106).

The method (500) includes converting (block 507) the second data bridge structure (FIG. 2, 212-2) from the second data format to the first data format. A converting module (FIG. 2, 214-7) may convert (block 507) the second data bridge structure (FIG. 2, 212-2) from the second data format to the first data format. The method (500) may also include communicating (block 508) the second data bridge structure (FIG. 2, 212-2) in the first data format to first computer language layer (FIG. 1, 105).

FIG. 6 represents a computing device (600) for transferring data between computer language layers (FIG. 1, 105, 106) according to one example of the principles described herein. The computing device (600) for transferring data between computer language layers (FIG. 1, 105, 106) may be implemented by an electronic device. Examples of electronic devices include servers, desktop computers, laptop computers, personal digital assistants (PDAs), mobile devices, smartphones, gaming systems, and tablets, among other electronic devices.

The computing device (600) may be utilized in any data-processing scenario, including stand-alone hardware, mobile applications, a computing network, or combinations thereof. Further, the computing device (600) may be used in a computing network, a public cloud network, a private cloud network, a hybrid cloud network, other forms of networks, or combinations thereof. In one example, the methods provided by the computing device (600) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; an application program interface (API), or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (600) are executed by a local administrator.

To achieve its desired functionality, the computing device (600) may include various hardware components. Among these hardware components may be a number of processors (601), a data bridge transferring system (602), a number of peripheral adapters (604), and a number of network adapters (603). These hardware components may be interconnected through the use of a number of buses and/or network connections. In one example, the processor (601), data bridge transferring system (602), peripheral device adapters (604), and network adapter (603) may be communicatively coupled via a bus (605).

The computing device (600) may include various types of memory modules, including volatile and nonvolatile memory. For example, the transferring system (602) may include Random Access Memory (RAM) (606), Read Only Memory (ROM) (607), and Hard Disk Drive (HDD) memory (608). Many other types of memory may also be utilized, and the present specification contemplates the use of as many varying type(s) of memory in the computing device (600) as may suit a particular application of the principles described herein. In other examples, different types of memory in the computing device (600) may be used for different data storage needs. In some examples, the processor (601) may boot from Read Only Memory (ROM) (607), maintain nonvolatile storage in the Hard Disk Drive (HDD) memory (608), and execute program code stored in Random Access Memory (RAM) (606).

The hardware adapters (603, 604) in the computing device (600) enable the processor (601) to interlace with various other hardware elements, external and internal to the computing device (600). The peripheral device adapters (604) may provide an interface to input/output devices, such as a display device (609), a mouse, or a keyboard. The peripheral device adapters (603) may also provide access to other external devices, such as an external storage device, a number of network devices, such as servers, switches, and routers, client devices, other types of computing devices, or combinations thereof.

The display device (609) may be provided to allow a user of the computing device (600) to interact with and implement the functionality of the computing device (600). The peripheral device adapters (604) may also create an interface between the processor (601) and the display device (609), a printer, or other media output devices. The network adapter (603) may provide an interface to other computing devices within, for example, a network, thereby enabling the transmission of data between the computing device (600) and other devices located within the network.

The data bridge transferring system (602) may include a number of modules used in the implementation of the support for transferring data between computer language layers (FIG. 1, 105, 106). The various modules within the computing device (600) comprise executable program code that may be executed separately. The various modules may be stored as separate computer program products. The various modules within the computing device (600) may be combined within a number of computer program products; each computer program product comprising a number of the modules.

The computing device (600) includes a receiving module (614-1) to receive, from a first computer language layer (FIG. 1, 105), a first data bridge structure (FIG. 2, 212-1) in a first data format. The first data format is a format used by the first set of computer code using the first computer language layer (FIG. 1, 105). The receiving module (614-1) may receive the first data bridge structure (FIG. 2, 105) from a number of first language modules (FIG. 1, 101).

The transforming module (614-2) transforms the first data bridge structure (FIG. 2, 212-1) from the first data format to a second data format. The second data format is a format used by a second computer language layer (FIG. 2, 106). The transforming module (614-2) may transform all of the first data bridge structure (FIG. 2, 212-1) or part of the first data bridge structure (FIG. 2, 212-1). In some examples, the transforming module (614-2) may use a number of different data transformations for different fields in the first data bridge structure (FIG. 2, 212-1).

The placing module (614-3) places a boundary data pattern adjacent to a field in the first data bridge structure (FIG. 2, 212-1) that is received from the first set of computer code using the first computer language layer (FIG. 1, 105). The first data bridge structure (FIG. 2, 212-1) may be replicated before sending the first data bridge structure (FIG. 2, 212-1) to the second computer program layer (FIG. 1, 106).

The transmitting module (614-4) transmits the first data bridge structure (FIG. 2, 212-1) to the second set of computer code using the second computer language layer (FIG. 1, 106). The second set of computer code using the second computer language layer (FIG. 1, 106) may act on the first data bridge structure (FIG. 2, 212-1).

The accepting module (614-5) accepts, from the second set of computer code using the second computer language layer (FIG. 1, 106), a second data bridge structure (FIG. 2, 212-2) in the second data format. The verifying module (614-6) verifies that the boundary data pattern is adjacent to a field in the second data bridge structure (FIG. 2, 212-2) that is accepted from the second set of computer code using the second computer language layer (FIG. 1, 106). Specifically, the verifying module (614-6) verifies that the boundary data pattern is in the same position as originally placed by the placing module (614-3). The converting module (614-7) converts the second data bridge structure (FIG. 2, 212-2) from the second data format to the first data format. The communicating module (614-8) communicates the second data bridge structure (FIG. 2, 212-2) in the first data format to the first set of computer code using the first computer language layer (FIG. 1, 106).

Figure 7:
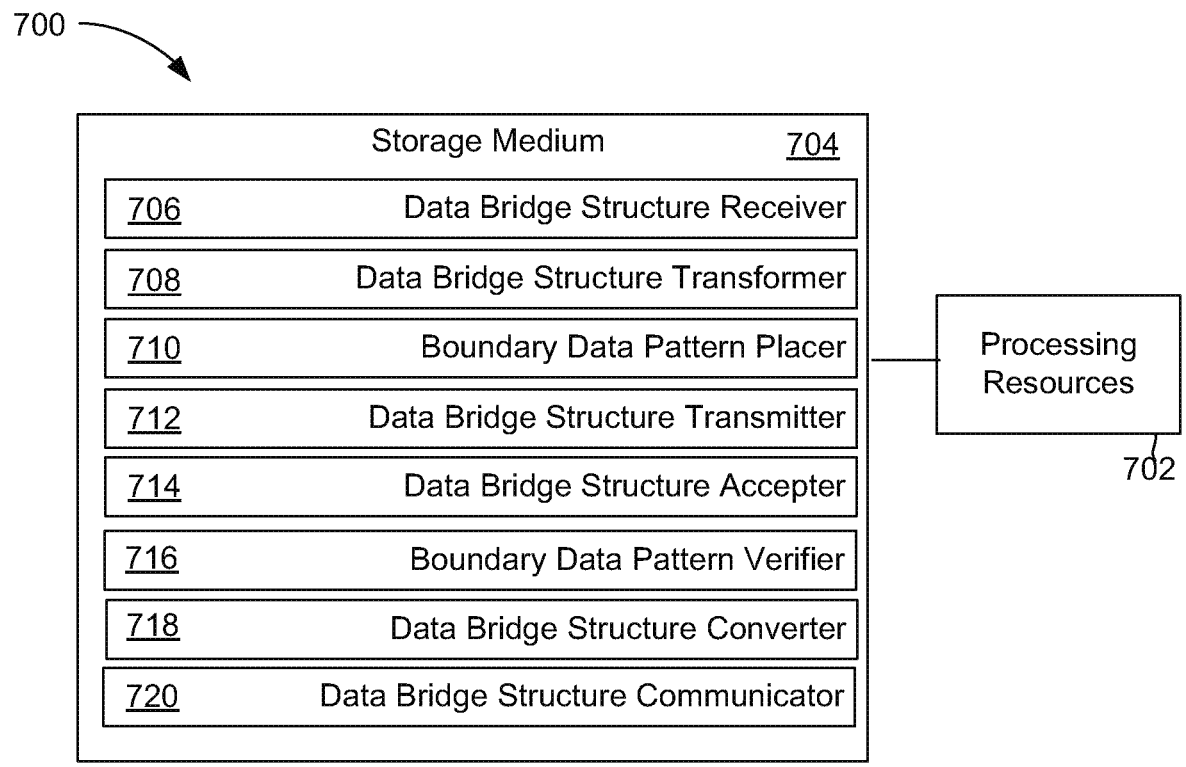
FIG. 7 is a diagram of a data bridge transfer system, according to one example of the principles described herein.

FIG. 7 is a diagram of a data bridge transferring system (700) according to one example of the principles described herein. The data bridge transferring system (700) includes processing resources (702) that are in communication with memory resources (704). The processing resources (702) include at least one processor and other resources used to process programmed instructions. The memory resources (704) generally represent any memory capable of storing data, such as programmed instructions or data structures to be used by the transferring system (700). The programmed instructions shown stored in the memory resource (704) include a data bridge structure receiver (706), a data bridge structure transformer (708), a boundary data pattern placer (710), a data bridge transmitter (712), a data bridge structure accepter (714), a boundary data pattern verifier (716), a data bridge structure converter (718), and a data bridge structure communicator (720).

The data bridge structure receiver (706) represents programmed instructions that, when executed, cause the processing resource (702) to receive, from a first computer language layer (FIG. 1, 105), a first data bridge structure (FIG. 2, 212-1) in a first data format, the first data format being a format used by the first set of computer code using the first computer language layer (FIG. 1, 105). The data bridge structure transformer (708) represents programmed instructions that, when executed, cause the processing resource (702) to transform the first data bridge structure (FIG. 2, 212-1) from the first data format to a second data format, the second data format being a format used by a second computer language layer (FIG. 1, 106).

The boundary data pattern placer (710) represents programmed instructions that, when executed, cause the processing resource (702) to place a boundary data pattern adjacent to a field in the first data bridge structure (FIG. 2, 212-1) that is received from the first set of computer code using the first computer language layer (FIG. 1, 105). The data bridge transmitter (712) represents programmed instructions that, when executed, cause the processing resource (702) to transmit the first data bridge structure (FIG. 2, 212-1) to the second set of computer code using the second computer language layer (FIG. 1, 106).

The data bridge structure accepter (714) represents programmed instructions that, when executed, cause the processing resource (702) to accept, from the second set of computer code using the second computer language layer (FIG. 1, 106), a second data bridge structure (FIG. 2, 212-2) in the second data format. The boundary data pattern verifier (716) represents programmed instructions that, when executed, cause the processing resource (702) to verify that the boundary data pattern is adjacent to a field in the second data bridge structure (FIG. 2, 212-2) that is accepted from the second set of computer code using the second computer language layer (FIG. 1, 106). The data bridge structure converter (718) represents programmed instructions that, when executed, cause the processing resource (702) to convert the second data bridge structure (FIG. 2, 212-2) from the second data format to the first data format. The data bridge structure communicator (720) represents programmed instructions that, when executed, cause the processing resource (702) to communicate the second data bridge structure (FIG. 2, 212-2) in the first data format to the first set of computer code using the first computer language layer (FIG. 1, 105).

The preceding description has been presented to illustrate and describe examples of the principles described. This description is not intended to be exhaustive or to limit these principles to any precise form disclosed. Many modifications and variations are possible in light of the above teaching.

What is claimed is:

1. A computer implemented method for transferring data between computer language layers, the method comprising:
receiving a first data bridge structure in a first data format from a first computer language layer that includes a first set of computer code, wherein the first data bridge structure includes a number of character fields including a request field indicating a function to be performed for the first set of computer code by a second computer language layer that includes a second set of computer code, wherein the first and second sets of computer code use different computer languages;
transforming the first data bridge structure from the first data format to a second data format that is being used by the second set of computer code, wherein the transforming includes transforming data in the character fields from a defined first character set to a defined second character set; and
transferring data between the first and second computer language layers by sending, to the second set of computer code, the first data bridge structure in the second data format.

2. The method of claim 1, wherein the first data bridge structure further comprises numeric fields.

3. The method of claim 2, wherein the transforming further comprises transforming the numeric fields of the first data bridge structure to a different endian state.

4. The method of claim 1, wherein the first data bridge structure includes:
an argument field comprising characters designating arguments to the function indicated by the request field.

5. The method of claim 1, wherein the first data bridge structure comprises:
a character buffer to transfer character data between the first set of computer code and the second set of computer code; and
a data buffer to transfer computer data between the first set of computer code and the second set of computer code.

6. The method of claim 5, further comprising:
placing a boundary data pattern adjacent to the character buffer of the first data bridge structure; and
verifying that the boundary data pattern is adjacent to the character buffer of a second data bridge structure that is received from the second set of computer code.

7. The method of claim 5, further comprising:
placing a boundary data pattern adjacent to the data buffer of the first data bridge structure that is received from the first set of computer code; and
verifying that the boundary data pattern is adjacent to the data buffer of a second data bridge structure that is received from the second set of computer code.

8. The method of claim 1, further comprising:
accepting a second data bridge structure in a second data format from the second set of computer code;
converting the second data bridge structure from the second data format to the first data format; and
communicating the second data bridge structure in the first data format to the first set of computer code.

9. The method of claim 8, wherein the first data bridge structure and the second data bridge structure occupy the same memory location.

10. The method of claim 1, wherein transforming the first data bridge structure from the first data format to the second data format comprises transforming at least one of the request field, an argument field, and a character buffer from a first character set to a second character set.

11. A system for transferring data between a first computer language layer and a second computer language layer, the system comprising:
a processor;
memory communicatively connected to the processor; and
a data communication system comprising:
a receiving module to receive a first data bridge structure in a first data format from a first computer language layer that includes a first set of computer code, wherein the first data bridge structure includes a number of character fields including a request field indicating a function to be performed for the first set of computer code by a second computer language layer that includes a second set of computer code, wherein the first and second sets of computer code use different computer languages;

a transforming module to transform the first data bridge structure from the first data format to a second data format that is being used by the second set of computer code, wherein the transforming includes comprising transforming data in the character fields from a defined first character set to a defined second character set; and a transferring module to transfer data between the first and second computer language layers by sending, to the second set of computer code, the first data bridge structure in the second data format.

12. The system of claim 11, wherein the first data bridge structure further comprises numeric fields.

13. The system of claim 12, wherein the transforming module is to transform the numeric fields of the first data bridge structure to a different endian state.

14. The system of claim 11, wherein the first data bridge structure includes:

an argument field comprising characters designating arguments to the function indicated by the request field.

15. The system of claim 11, wherein the first data bridge structure comprises:

a character buffer to transfer character data between the first set of computer code and the second set of computer code; and a data buffer to transfer computer data between the first set of computer code and the second set of computer code.

16. The system of claim 15, further comprising:

a placing module to place a boundary data pattern adjacent to the character buffer of the first data bridge structure; and a verifying module to verify that the boundary data pattern is adjacent to the character buffer of a second data bridge structure that is received from the second set of computer code.

17. The system of claim 15, further comprising:

a placing module to place a boundary data pattern adjacent to the data buffer of the first data bridge structure that is received from the first set of computer code; and a verifying module to verify that the boundary data pattern is adjacent to the data buffer of a second data bridge structure that is received from the second set of computer code.

18. A computer implemented method for transferring data between computer language layers, the method comprising:

receiving data in different formats from a plurality of different modules of first computer language layer that includes a first set of computer code;

combining the data received from the different modules in a first data bridge structure corresponding to the first computer language layer, wherein the first data bridge structure includes a request field indicating a function to be performed for the first set of computer code by a second computer language layer that includes a second set of computer code, wherein the first and second sets of computer code use different computer languages;

transforming the first data bridge structure from a first data format to a second data format that is being used by the second set of computer code; and transferring data between the first and second computer language layers by sending, to the second set of computer code, the first data bridge structure in the second data format.

19. The method of claim 18, wherein the first data bridge structure includes:

an argument field comprising characters designating arguments to the function indicated by the request field.

20. The method of claim 18, wherein the first data bridge structure comprises:

a character buffer to transfer character data between computer code and the second set of computer code; and a data buffer to transfer computer data between the first set of computer code using the first computer language layer and the second set of computer code.

* * * * *